Patented Aug. 26, 1947

2,426,450

UNITED STATES PATENT OFFICE 2,426,450

PROCESS FOR PRODUCING BUTADIENE

William J. Hale, Midland, Mich., and Harry Miller, Columbia, Mo., assignors, by direct and mesne assignments, to National Agrol Company, Inc., Washington, D. C., a corporation of Delaware No Drawing. Application February 22, 1943, Serial No. 476,758

16 Claims. (Cl. 260—681)

This invention relates to a method for dehydrating and more particularly to dealcoholating and to a method of forming butadiene through the agency of a dehydrative catalyst.

This application is a continuation-in-part of our copending application Serial Number 465,391, filed November 12, 1942.

Among the objects of this invention may be noted the provision of a method for dehydration; the provision of a method of the type indicated which provides improved yields of 1,3-butadiene; the provision of dehydration methods which form 1,3-butadiene without the formation of substantial proportions of unwanted by-products; and the provision of methods of the type referred to which leave unreacted components in a form suitable for use in the present invention. Other objects will be in part apparent and in part pointed out hereinafter.

The invention accordingly comprises the ingredients and combinations of ingredients, the proportions thereof, steps and sequence of steps, and features of composition and synthesis, analysis, or metathesis, which will be exemplified in the products and processes hereinafter described, and the scope of the application of which will be indicated in the following claims.

In our earlier application, Serial Number 465,391, we have described fully the course of various reactions involved when an alcohol reacts with an aldehyde and when the resulting acetal is subjected to a dehydrative catalyst in the presence of ethylene. It has been recommended that the dealcoholated diethyl acetal, known as vinyl ethyl ether, might well be mixed with an incoming portion of the diethyl acetal itself to constitute a preferred feed to the system for reaction with the ethylene. In the light of recent discoveries we now choose to modify this general procedure to obtain a higher conversion into 1,3-butadiene per pass with much smaller proportions of impurities.

When operating under the influence of a particularly active dehydrative (hydrative) catalyst there is the possibility that when acetals are present a certain portion of the alcohol liberated in the dealcoholation of the acetal, might be dehydrated to an ether and water, or to an olefine and water if the alcohol has at least a two carbon atom chain.

We have now found that under the conditions of operation accompanying use of an active dehydrative catalyst it is not advisable to raise the temperature above approximately 200–205° C. when reacting ethylene with, for example, diethyl acetal and its dealcoholated form, vinyl ethyl ether. Otherwise the effect of an increased amount of moisture tends to vitiate the results. As soon as water appears in the system there is the possibility of hydrolysis of the acetal itself into acetaldehyde and alcohol as well as of the vinyl ethyl ether into vinyl alcohol and ethyl alcohol. Also there is the possibility of condensations of the aldehyde, as well as a series of complicated reactions of the butadiene with water. As little as ¼ of one per cent of water is deleterious.

1,3-butadiene is stable in the presence of water but under the influence of active dehydrative (hydrative) catalysts, it reacts to give the anhydride of 2,3-butylene glycol

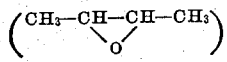

which immediately rearranges into methyl ethyl ketone (CH₃—CO—C₂H₅). A further undesirable product formed in lesser amount is butyric aldehyde (CH₃—CH₂—CH₂—CHO) which is formed by the complete dehydration of the acetyl group of methyl ethyl ketone and rehydration of the same in reverse order. These two impurities are present in something approaching a total of 10% by weight of the butadiene formed by one pass over an especially active dehydrative catalyst such as a mixture of freshly precipitated aluminum oxide and the blue oxide of tungsten at as low a temperature as 190° C. More detrimental, of course, is the tendency of butadiene to hydrate when the temperature approaches 230–250° C. especially under increased pressure.

This is the reason why processes for the commercial manufacture of butadiene which start with ethyl alcohol or acetaldehyde or mixtures of the two and are carried out at temperatures above 250° C. are accompanied by extraordinarily low yields of butadiene, even though at high temperatures methyl ethyl ketone itself may be made to form butadiene. In all the yield of butadiene in these so-called "cracking" processes does not exceed about 2.2 lbs. per gallon of original ethyl alcohol, whereas the theoretical yield from a gallon of ethyl alcohol is 3.86 lbs of butadiene. By the procedure of this invention we have obtained as high as 3.2 lbs. of butadiene calculated per gallon of original alcohol.

According to the present invention the conversion of ethyl alcohol or acetaldehyde or compounds thereof into 1,3-butadiene is carried out under completely anhydrous conditions. When operating with diethyl acetal (CH₃CH(OC₂H₅)₂)

and ethylene, the first stage of the dealcoholation through vinyl ethyl ether ($CH_2=CH-O-C_2H_5$) and ethyl alcohol proceeds well and the ethylene in turn reacts with the vinyl ethyl ether to yield butadiene and ethyl alcohol, but at even as low a temperature as 220° C. a certain amount of this free ethyl alcohol suffered dehydration. This lowered the yield of butadiene, so it was in general considered most desirable to conduct this reaction at as low a temperature as 185–190° C., where however the speed of reaction is materially reduced.

We have now discovered that complete removal of the danger of olefine and water formation in the course of the passage of acetals over dehydrative catalysts is effected by choosing an alcohol inherently incapable of yielding an olefine by dehydration, such, for example, as methyl alcohol or its aryl derivative benzyl alcohol. In this way we utilize as starting materials dimethyl acetal $(CH_3CH(OCH_3)_2)$ and dibenzyl acetal

which respectively yield upon dealcoholation vinyl methyl ether ($CH_2=CH-O-CH_3$) and vinyl benzyl ether ($CH_2=CH-O-CH_2-C_6H_5$). We have therefore only to guard against dehydration of these alcohols into their respective ethers in order to eliminate completely the possibility of water formation in the system. This latter condition is obtained by operating with the dimethyl acetal and vinyl methyl ether, below 250° C., the temperature at which water begins to form through the dehydration of methyl alcohol in the presence of active aluminum oxides. Preferably a maximum temperature of 230° should not be exceeded in the use of catalysts containing certain other well known dehydrative oxides such as titanium oxide, zirconium oxide and molybdic oxide which act somewhat dehydrogenatively on methyl alcohol. The preferred feed to a system operating with ethylene in the production of butadiene may here again be chosen as a mixture of the acetal in question, dimethyl or dibenzyl acetals, and their dealcoholated forms, that is, the vinyl alkyl or vinyl aryl ether. The free alcohol which separates out in the first step following the reaction chamber may be brought into reaction with a second portion of acetaldehyde for recycling through the system.

With reference to the more or less unsatisfactory conditions that sometimes prevail where diethyl acetal and ethylene are made to react over an active dehydrative catalyst, we have now discovered that in the presence of such a catalyst especially if it has a dehydrogenative component, the ethyl alcohol liberated actually begins to suffer dehydration at as low a temperature as 240° C., approximately 10° below the corresponding point for methyl alcohol. Hence the use of diethyl acetal requires operation at lower temperatures than dimethyl acetal.

We have now discovered that the dealcoholation of dimethyl acetal to vinyl methyl ether and the dealcoholation of dibenzyl acetal into vinyl benzyl ether proceeds with great ease and that the subsequent interaction of ethylene upon these ethers is more or less dependent upon the ready dissociation of the ethylene. Generally speaking, at 200–205° C. vinyl methyl ether and ethylene in the presence of any good dehydrative, dehydrogenative catalyst will show a 30% conversion into butadiene in one pass. The presence of the dehydrogenative component in the catalyst materially aids the reaction of ethylene with the ether. Among the dehydrogenative agents that may serve this purpose may be mentioned the walls of the reaction chamber especially if it is composed of copper. Furthermore, the presence of silver, gold and mercury all contribute to the coupling reaction involved. The walls of the tube (reaction vessel) may be of any of the noble or near-noble metals, except mercury, which functions in the manner stated.

In this connection it has further been discovered that a small trace of a tertiary amine or of an amino organic base such as pyridine or quinoline, when added to the incoming mixture of vinyl alkyl or vinyl aryl ether and ethylene, contributes markedly to the speed of the reaction and hence leads to a greater percentage conversion into butadiene.

We have also discovered that the use of increased pressure contributes most favorably to the reaction between vinyl alkyl or vinyl aryl ethers and ethylene. From 3 to 4 atmospheres is found highly favorable although as much as 50 atmospheres has been found to be useful when, for example, vinyl ethyl ether is the ether concerned. Superatmospheric pressures tend to prevent the dehydration of ethyl alcohol and consequent formation of water. The preferred temperature range for interaction of ethylene upon vinyl alkyl or vinyl aryl ethers extends from 175 to 230° C. but not substantially above 250° C. whereas under pressure this temperature range may be considerably lower, even to 100° C., for example. A pressure of 40 atmospheres causes the reaction of diethyl acetal and ethylene to proceed at a rapid rate at 100° C. No water is formed since the catalyst is not effective to dehydrate ethyl alcohol under these conditions.

In our preferred method for producing butadiene from acetals and their dealcoholated forms, it is first necessary to prepare the acetal in as nearly pure condition as possible. A mixture of 2½ mols of methyl alcohol and 1 mol of acetaldehyde is allowed to stand overnight in the presence of a condensing agent such as zinc chloride or other well known condensing agents. The layer of acetal and excess alcohol is then removed and thoroughly dried over a drying agent and carefully fractionated using precautions to select a fraction practically free of acetaldehyde. The preparation of dibenzyl acetal is carried out in a similar manner.

The following examples illustrate the invention.

*Example 1*

Into a glass combustion tube of ⅞" internal bore with a length of 16" there was placed 100 g. of a freshly prepared mixture of aluminum oxide and blue oxide of tungsten in the form of 20 mesh pellets. This occupied about 8" of the total tube length. The temperature of the catalyst was then brought to 195–205° C. and a mixture of an excess of ethylene with 58 g. of vinyl methyl ether was passed through it in the course of thirty minutes. The yield of butadiene was 14.3 g. or 26.4% of theoretical.

*Example 2*

Into a copper combustion tube of ⅞" internal bore with a length of 16" there was placed 100 g. of a freshly prepared mixture of aluminum oxide and blue oxide of tungsten in the form of 20 mesh pellets. It occupied about 8" of the total tube length. The temperature of the catalyst was brought to 195–205° C. and a current of a mixture of 58 g. of vinyl methyl ether with an excess of ethylene was passed through the tube during the course of thirty minutes. The first condensate obtained with ice water consisted of methyl alcohol. The second condensate obtained by Dry Ice cooling to −2° C. consisted of unacted upon vinyl methyl ether (about 39 g.). The butadiene was collected over a gasometer with the ethylene. The butadiene weighed 17.7 g. calculating to 32.8% of theoretical.

*Example 3*

Example 2 was repeated in all respects except that the catalyst was made up of dehydrative and dehydrogenative agents. It consisted of 60 parts of freshly prepared aluminum oxide, 20 parts of blue oxide of tungsten, 10 parts of molybdenum oxide and 10 parts of metallic silver. Also the temperature was raised to 210–215° C. and the feed current was heated to approximately the same temperature. The yield of butadiene amounted to 21 g., calculating to 38.8% of theoretical.

*Example 4*

Example 3 was repeated in all respects except that the feed of 58 g. of vinyl methyl ether and an excess of ethylene contained two drops of quinoline. The yield of butadiene amounted to 28 g. calculating to 51.8% of theoretical.

*Example 5*

Example 4 was repeated in all respects except that a few drops of trimethyl amine were substituted for the quinoline. The yield was approximately the same as in Example 4.

*Example 6*

Example 4 was repeated in all respects except that the system was placed under 4 atmospheres of pressure. The yield rose to 35.4 g. of butadiene, calculating to 65.5% of theoretical.

*Example 7*

Example 3 was repeated but this time at a temperature of 235–240° C. and substituting for the vinyl methyl ether, 134 g. of vinyl benzyl ether dissolved in twice its volume of heptane. The weight of the catalyst was reduced to 20 g. The result was substantially the same; a yield of about 38% of theoretical of butadiene.

*Example 8*

Into a steel bomb of 100 ml. volume, 5 g. of vinyl ethyl ether was introduced with 5 g. of liquid ethylene and a catalyst of aluminum oxide, chromium oxide, tungsten oxide and copper. About 80% of the catalyst consisted of the mixed oxides and 20% of copper. The bomb was heated to 125° C. whereby a pressure of 600 lbs. was developed. After half an hour the bomb was opened and the reaction to butadiene was found to be about 50% complete.

By anhydrous we mean a water content of less than approximately $\frac{1}{10}$ of 1%.

In view of the above, it will be seen that the several objects of the invention are achieved and other advantageous results attained.

As many changes could be made in the above processes and products without departing from the scope of the invention, it is intended that all matter contained in the above description shall be interpreted as illustrative and not in a limiting sense.

We claim:

1. The method of making butadiene which comprises reacting a substance selected from the group consisting of dimethyl acetal, dibenzyl acetal, vinyl methyl ether and vinyl benzyl ether, with ethylene at temperatures under 250° C. and in the presence of a selected dehydrative catalyst containing less than 10% of its weight of a noble metal as a condensing agent which does not split off water from the liberated alcohol under the conditions of the operation.

2. A method of producing butadiene which comprises, reacting dimethyl acetal with ethylene, at temperatures below about 250° C. and in the presence of a dehydrative catalyst under conditions which tend to avoid splitting water from the liberated alcohol.

3. A method of making butadiene which comprises, reacting dimethyl acetal with ethylene, at temperatures below 250° C., in the presence of a catalyst comprising a preponderant amount of a dehydrative catalytic material and a smaller amount of a condensing agent comprising a noble metal.

4. A method of making butadiene which comprises, reacting dimethyl acetal with ethylene, at temperatures below about 250° C., in the presence of a dehydrative catalyst and a minor quantity of a tertiary amine as a condensing agent.

5. A method of making butadiene which comprises, reacting dibenzyl acetal with ethylene, at temperatures below about 250° C., in the presence of a dehydrative catalyst under conditions which tend to liberate alcohol but which do not release water from the liberated benzyl alcohol.

6. A method of making butadiene which comprises, reacting dibenzyl acetal with ethylene, at temperatures below about 250° C., in the presence of a selected dehydrative catalyst under conditions which tend to liberate alcohol but which do not liberate water from the formed benzyl alcohol, said catalyst containing a minor amount of a condensing agent comprised of a noble metal.

7. A method of producing butadiene which comprises, reacting dibenzyl acetal with ethylene, at temperatures below about 250° C., in the presence of a dehydrative catalyst and in the presence of a minor quantity of the vapors of a tertiary amine.

8. A method of producing butadiene which comprises, reacting vinyl methyl ether with ethylene, at temperatures below about 250° C., in the presence of a selected dehydrative catalyst which tends to liberate methyl alcohol, the conditions being such as to inhibit the dehydration of the liberated alcohol.

9. A method of making butadiene which comprises, reacting vinyl methyl ether with ethylene, at temperatures below about 250° C., in the presence of a catalytic material comprising a preponderant amount of a dehydrative catalyst incapable of dehydrating methyl alcohol, said catalyst containing a minor amount of a noble metal as a condensing agent.

10. A method of producing butadiene which comprises, reacting vinyl methyl ether with ethylene, at temperatures below about 250° C., in the presence of a small quantity of a tertiary amine and a selected dehydrative catalyst which tends to liberate methyl alcohol but which does not dehydrate the liberated methyl alcohol under the conditions of the reaction.

11. A process of producing butadiene which comprises reacting, a mixture of vinyl methyl ether and dimethyl acetal with ethylene, at temperatures below about 250° C. and in the presence of a selected dehydrative catalyst which tends to liberate methyl alcohol but which does not dehydrate the liberated methyl alcohol under the conditions of the operation.

12. A method of producing butadiene which comprises, reacting vinyl methyl ether and dimethyl acetal with ethylene at temperatures below about 250° C. and in the presence of a catalytic mass comprising a preponderant amount of a dehydrated catalyst which tends to liberate methyl alcohol but which does not dehydrate the liberated methyl alcohol and a minor amount of a noble metal.

13. A method of producing butadiene which comprises, reacting vinyl methyl ether and dimethyl acetal with ethylene, at temperatures below about 250° C., in the presence of the vapors of a tertiary amine and in contact with a selected dehydrative catalyst which tends to liberate methyl alcohol but which does not dehydrate the liberated methyl alcohol under the conditions of the operation.

14. The process of making butadiene which comprises, reacting vinyl benzyl ether and dibenzyl acetal with ethylene, at temperatures below about 250° C., and in the presence of a selected dehydrative catalyst which tends to liberate benzyl alcohol but which does not dehydrate the liberated benzyl alcohol.

15. A process according to claim 14 in which the dehydrative catalyst contains approximately 10% of a noble metal 16. A process according to claim 14 in which the reaction mixture contains a minute quantity of a tertiary amine as a condensing agent.

WILLIAM J. HALE.
HARRY MILLER.

REFERENCES CITED

The following references are of record in the file of this patent:

UNITED STATES PATENTS

| Number | Name | Date |
| --- | --- | --- |
| 2,204,157 | Semon | June 11, 1940 |
| 2,241,792 | Reppe et al. | May 13, 1941 |

FOREIGN PATENTS

| Number | Country | Date |
| --- | --- | --- |
| 15,806 | Great Britain | July 2, 1914 |

OTHER REFERENCES

Ostromysslenski, J. Soc. Chem. Ind., 35, No. 1, pages 69–70 (1916).

Egloff et al., Oil and Gas Jour., pages 36–37, Dec. 17, 1942.

Whitmore, "Organic Chemistry," page 239, Van Nostrand, 1937.

Ostromysslenski et al., J. Russ. Phys. Chem., 46, pages 123–33 (1914).

Talalay et al., Rubber Chemistry and Technology, 15, pages 424–5 (1942). Entire article extends from page 403 to 429, but only pages 424–5 are considered to be of interest.